United States Patent Office

3,080,362
Patented Mar. 5, 1963

---

3,080,362
PROCESS FOR THE REDUCTION OF CARDENO-LIDE AND BUFADIENOLIDE STEROIDS
Christoph Tamm, Riehen, Switzerland, assignor to Sandoz, A.G., Basel, Switzerland, a Swiss firm
No Drawing. Filed Jan. 9, 1961, Ser. No. 81,231
Claims priority, application Switzerland Jan. 21, 1960
5 Claims. (Cl. 260—239.57)

The present invention relates to the novel selective reduction of the isolated carbonyl group in steroids of the cardenolide and bufadienolide series to the corresponding alcohol by a novel process employing an inert organic solvent solution of lithium tritertiary butoxy aluminum hydride.

These steroids of the cardenolide and bufadienolide series represent compounds of unusual complication (see "Natural Products Related to Phenanthrene" Fieser and Fieser, third edition, A.C.S. Monograph 70, Reinhold Publishing Co., pp. 507–8). These steroids of these named series occur in nature and are characterized by their ability to exert a specific powerful action of the cardiac muscle of man and animals, in one group being products of plant synthesis found in seeds and bark leaves such as digitoxigenin, for example, a sugar free cardiac aglycone from hydrolysis of digitoxin glycoside, and in another group being products elaborated in the organism of the toad and found in the skin secretions of the animal, such as bufalin.

These drugs are rare and expensive. In the form of the naturally occurring glycosides known as plant heart poisons and toad poisons, they are often of variable character, the poison being present in very small quantities frequently in combination with inactive saponins, digitonins, which render purification difficult and these poisons being extremely sensitive to action of enzymes, acids and bases. The cardiotonic principle of the poison is associated not with the sugar residue of the glycoside but rather with the steroid residue and the steroid residue provides the basic chemical complication and sensitivity.

It is an object of the invention therefore to provide improved procedures for selective reduction of a limited class of the steroid residues in which the isolated carbonyl group in the 3 and 19 positions is reduced to the alcohol without disturbing the carbon to carbon double bonds in the compounds of the cardenolide and bufadienolide series.

The specific structural difficulty in these steroid series prohibiting selective reduction of the isolated carbonyl groups in the steroid residue utilizing the ordinary carbonyl reducing agents without at the same time causing saturation of the carbon to carbon double bond is due to the specific location of the double bond in these steorid series, the butenolide ring of the cardenolide series being an alpha-beta unsaturated gamma lactone while the hexadienolide ring of the bufadiene series is an alpha-beta-gamma-delta unsaturated delta lactone. Taking an example of the first class, the butenolide ring in strophanthidin of the cardenolide series, contains two unsaturated centers, the carbon to carbon double bond of the unsaturated lactone and the aldehyde group of the lactone. Catalytic hydrogenation is known to attack first the double bond in the lactone ring (see Fieser and Fieser, loc. cit., pp. 516–517) and the product, dihydrostrophanthidin still bears the intact aldehydic group remote in the steroid from the ring which can be oxidized to the corresponding acid.

Reduction of the aldehyde group isolated in the steroid residue from the lactone while leaving the lactone unsaturation intact and thus the lactone ring intact is not possible by catalytic hydrogenation yet is surprisingly effected under extremely mild conditions by the novel process of the invention. Both catalytic and LiAlH$_4$ reduction are unsatisfactory.

A known exception to the behavior of the usual reducing agents is that of aluminum amalgam and of aluminum isopropylate which, in the case of strophanthidin reduces the remote aldehydic carbonyl to the corresponding alcohol (strophanthidol) while leaving the unsaturation in the lactone ring intact. The conditions of reaction are, however, generally more severe with the aluminium amalgam or aluminum isopropoxide reducing agent than with the lithium tritertiary butoxy aluminum hydride reducing agent of the invention since the invention may employ the reagent at 0° C. in inert organic solvent, for example, tetrahydrofurane solution to effect successful selective yet complete, carbonyl reduction in as little as 15 minutes and not more than 1 hour, the unsaturation in the lactone ring of the cardenolide series remaining intact. The advantage of such mild treatment is believed by the very nature of the unusually complicated and chemically sensitive steroid to be obvious.

More important is the fact that while aluminum amalgam and aluminum isopropylate can both effect selective reduction of aldehyde in strophanthidin, these reagents are not wholly unsuccessful for reduction of carbonyl group only in the bufadienolide series which is a still more costly class of compounds in which hexadienolide unsaturation presents a much more difficult problem than in the cardenolide series due to the doubling of the unsaturation in the lactone ring. Aluminum isopropylate was also used to reduce the isolated 3-keto group in scillarenon ($\Delta^4$-3-ketone) yielding the allylic alcohol, scillarenin.

Aluminum amalgam is completely unsuitable in the bufadienolide series because it reduces the hexadienolide ring. The procedural advantage provided by the mild reduction treatment by the dissolved reducing agent of the invention is thus had for steroid members of both series, bufadienolides and cardenolides. A further advantage lies in the fact that the problem of selection of appropriate reducing agent of different groupings in these series is overcome by the present reducing agent which is equally selective for carbonyl in both series, and costly mistakes based upon mistaken selection of reducing agent can be avoided.

Sodium borohydride (NaBH$_4$) has also been suggested for the reduction of the angular $C_{19}$ aldehyde group in cardenolides and bufadienolides as well as the reduction of 3-keto groups in 3-keto-cardenolides but it has been observed that the hexadienolide ring in the bufadienolide series is not stable in the presence of this reducing agent. Accordingly, this reagent demonstrates a greater resistance for the butenolide ring of the cardenolide series. However, this reducing agent has a more serious disadvantage when it is used in the presence of mannitol or under other conditions in that it is extremely difficult to purify the desired reduction product and eliminate all of the boron from the product due to the use of this boron containing reducing agent. Boron impurities make purification by recrystallization very difficult and result in a great loss of valuable material.

Accordingly, a further object of the invention is to provide a generally applicable method for selective reduction of isolated carbonyl group in steroids of the cardenolide and bufadienolide series characterized by the use of lithium tritertiary butoxy aluminum hydride as the sole reducing agent under low temperature conditions, e.g., about 0° C. up to 20° C. in an inert organic solvent such as tetrahydrofurane, whereby the desired selectively reduced steroid may be recovered after reaction for not more than about 1 hour.

By the use of these very mild conditions with the novel method 3-epibufalin is easily prepared from 3-dehydrobufalin the keto group in the 3 position being reduced at 0° C. in 15–60 minutes. The $C_{19}$ aldehyde group can be reduced at 0° C. for 8 hours or at 20° C. in 1 hour in strophanthidin to recover strophanthidol. Similarly, the $C_{19}$ aldehyde group in hellebrigenin is reduced under the same conditions to hellebrigenol and 3-O-acetyl-strophanthidin is reduced to 3-O-acetyl-strophanthidol.

In the following examples which illustrate but do not limit the invention all values of temperature are given in degrees centigrade and the melting points are corrected.

EXAMPLE 1

3-Epi-Digitoxigenin From 3-Dehydro-Digitoxigenin (a) Preparation of solution of lithium tritertiary butoxy aluminum hydride in inert organic solvent: In 250 cubic centimeters of anhydrous diethyl ether there were suspended 2.5 grams of lithium aluminum hydride which were brought into solution by heating under reflux for 30 minutes and filtered, the filtrate (207 cubic centimeters) containing 1.71 grams of $LiAlH_4$ as determined by titration. In the titration 1 cubic centimeter of the ether solution was decomposed with about 10 cubic centimeters of 1:1 methanol and water and the liberated lithium hydroxide titrated with 0.1 N HCl with phenolphthalein indicator.

To 205 cubic centimeters of the ethyl solution of $LiAlH_4$ there were added, dropwise, and at room temperature with agitation, 10.03 grams of anhydrous tertiary butanol dissolved in 100 cubic centimeters of absolute ether. A white precipitate of the lithium tritertiary butoxy aluminum hydride was separated from the remaining ether by decantation and this separated precipitate was dissolved in 100 cubic centimeters of freshly distilled tetrahydrofuran. This tetrahydrofuran solution constitutes the "reduction solution" of this and the remaining examples herein.

(b) Reduction with reduction solution: A solution of 161 milligrams of 3-dehydro-digitoxigenin (melting point 198–201°) was prepared in 8 cubic centimeters of tetrahydrofuran and cooled to 0° C. To this solution there were added 8 cubic centimeters of the "reduction solution" prepared in (a) above and the mixture was left standing for 15 minutes at 0° C. At the end of the reaction period, the solution was decomposed with 70 cubic centimeters of 5% acetic acid in water and then extracted with chloroform. The chloroform extract was then washed first with saturated potassium bicarbonate solution, then with water and finally dried over anhydrous sodium sulfate. The volatile solvent was removed under vacuum and the residue comprised 161 milligrams of crude reduction product. This crude reduction product gave from methanol-ether chromatographically pure 3-epi-digitoxigenin in an amount of 123 milligrams, melting point 275–282°. The mother liquor representing 36 milligrams was chromatographed on 3.6 grams of aluminum oxide ($Al_2O_3$) and some 20 fractions eluted from the alumina column.

Fractions 1–9 eluted with chloroform containing 0.2% methanol gave only traces of amorphous material.

Fractions 10–14 eluted with chloroform containing 0.2% methanol were combined and crystallized from 1:1 methanol-ether and crystals were recovered in an amount of 26 mg. This product was further purified by paper chromatography to separate about 50% of the product as digitoxigenin and about 50% of the product as 3-epi-digitoxigenin.

Fractions 15–20 eluted from the alumina column with chloroform containing 1% methanol were combined and crystallized from 1:1 methanol-ether, yield 8 mg. of 3-epi-digitoxigenin containing only traces of digitoxigenin as demonstrated by paper chromatogram. Thus the total recovery was 144.5 mg. of 3-epi-digitoxigenin and 13 mg. of digitoxigenin.

EXAMPLE 2

3-Epi-Bufalin From 3-Dehydro-Bufalin

By the process as set forth in Example 1(b) above, a solution of 80 mg. of 3-dehydro-bufalin, melting point 219–231° and pure by paper chromatography standards, was dissolved in tetrahydrofuran and reduced with about 5 cc. of the "reduction solution" of Example 1(a) at a temperature of 0° for 15 minutes. The reduced crude product in an amount of 8.0 mg. was worked up by the same procedure of Example 1(b), e.g., first checking the purity by separating the components by paper chromatography to disclose only the reduced product, 3-epi-bufalin and no bufalin by this method of separation and second by recrystallization. By crystallizing the material from acetone-methanol-ether mixture, 73 mg. of crystals having melting point of 225–241° and after recrystallizing from 1:1 methanol-acetone, 60 mg. of 3-epi-bufalin, melting point 235–259°, $[\alpha]_D^{22} = +120° \pm 1.5°$ (c=1.689 in methanol) were recovered.

EXAMPLE 3

Strophanthidol From Strophanthidin

By the process as set forth in Example 1(b) above, a solution of 400 mg. of strophanthidin, melting point 139–143°, was reduced with the proportional amount of "reduction solution" of Example 1(a) at a temperature of 0° C. for 1 hour and a crude reduction product was recovered in an amount of 417 mg. By paper chromatography the crude reduction product was demonstrated to contain both starting strophanthidin and strophanthidol reduction product. The product was chromatographed with 20 grams of $Al_2O_3$ and about 52 fractions collected by eluting with chloroform containing trace amounts of methanol, the fractions and treatment identified below.

Fractions 1–8 (combined) eluted with chloroform containing 0.25% methanol, yielded 13 mg. of solid material which showed a paper spot having an Rf value of 0.87 by the paper chromatographic technique of Example 1.

Fractions 14–26 (combined) eluted with chloroform plus 0.5% methanol than with chloroform plus 1% methanol, yield 78 mg.; demonstrated as strophanthidin by paper chromatography.

Fractions 27–32 (combined) eluted with chloroform plus 2% methanol, yield 85 mg.; demonstrated as 50/50 mixture strophanthidin-strophanthidol by paper chromatography.

Fractions 33–52 (combined) eluted with chroform plus 2% methanol then plus 5% methanol, yield 170 mg.; demonstrated to be pure strophanthidol by paper chromatography.

In the manner detailed above, a total of 120 mg. of strophanthidin starting material and of 220 mg. of strophanthidol, reduction product, was recovered.

EXAMPLE 4

3-O-Acetyl-Strophanthidol From 3-O-Acetyl-Strophanthidin

By the process as set forth in Example 1(b), a solution of 170 mg. of 3-O-acetyl-strophanthidin, double melting points 183–191°/215–220°, was reduced with the proportional amount of "reduction solution" of Example 1(a) at a temperature of 0° C. for 1 hour and a crude reduction product was recovered in an amount of 185 mg. The product examined by paper chromatography showed only 3-O-acetyl-strophanthidol and it was crystallized from 1:1 acetone-ether to provide 155 mg. of crystalline 3-O-acetyl-strophanthidol, melting point 221–231°. The mother liquor from recrystallization was examined by paper chromatography and demonstrated to contain only a trace of 3-O-acetyl-strophanthidin with practically all of the product therein being 3-O-acetyl-strophanthidol.

EXAMPLE 5

*Hellebrigenol From Hellebrigenin*

By the process as set forth in Example 1(*b*), a solution of 52 mg. of hellebrigenin, melting point 220–226°, was reduced with the "reduction solution" of Example 1(*a*) at a temperature of 0° C. for 15 minutes and there were recovered 57 mg. of crude reduction product, which was tested by paper chromatography for purity, and demonstrated to contain the reduced material as the principal product with the starting material as a minor product. The crude mixture was then chromatographed with 3 grams of $Al_2O_3$ and the following fractions eluted.

Combined fractions 1–3, eluted with chloroform, yield 1.5 mg. of amorphous solid material.

Combined fractions 4–10, eluted with chloroform-methanol 99:1, yield 12 mg. of solid material demonstrated to be pure hellebriginen by paper chromatography; recrystallized from acetone-methanol-ether gave 7 mg. of crystalline product, melting point 222–225°.

Combined fractions 11–29, eluted with 99:1, 98:2 and 95:5 chloroform-methanol, yielded 32 mg. of material, demonstrated by paper chromatography to be pure hellebrigenol; recrystallizing from acetone-methanol-ether to yield 26 mg. of crystals having double melting points 155–167°/221–224°.

The foregoing examples illustrate the method of the invention which is useful for the preparation of various intermediate products of technical importance in the manufacture of cardiac glycosides as well as intermediate products for the manufacture of cortico steriods, the advantages of low temperature, short reaction time, and selective carbonyl reduction being achieved in a new and highly advantageous yet extremely simple manner to effect economy of materials, improvement in both purity and yield of product with obvious advantages which flow therefrom.

Although the above examples show use of lithium in tertiary butoxy aluminum hydride in separate solvent solution, the compound may be prepared separately and dissolved in the same inert solvent in which the starting steroid is dissolved.

In the foregoing examples only tetrahydrofuran has been illustrated as the inert solvent for the reduction reaction; other inert solvents may be used, for example, dioxan.

Having thus disclosed the invention, there is claimed:

1. A method for the selective reduction of isolated carbonyl group in the 3 and in the 19 positions in steroids of the cardenolide and bufadienolide series comprising reacting a carbonyl bearing compound of said series dissolved in an inert organic solvent with lithium tritertiary butoxy aluminum hydride to reduce said carbonyl group only and isolating the reduced compound.

2. A method as claimed in claim 1 wherein said lithium tritertiary butoxy aluminum hydride is first dissolved in inert organic solvent and said reaction is carried out at about 0°–20° C. for a period varying from about 15 minutes to 8 hours, the longer time being used at the lower temperature.

3. A method as claimed in claim 1 wherein said inert organic solvent is tetrahydrofuran.

4. A method as claimed in claim 2 wherein said inert solvent which dissolves said lithium tritertiary butoxy aluminum hydride is the same solvent as used to dissolve the starting steroid.

5. A method as claimed in claim 4 wherein said organic solvent is tetrahydrofuran.

References Cited in the file of this patent

Wheeler et al.: Canadian Journal of Chemistry, vol. 36, pages 1431–1436 (1958).